United States Patent
Uruma

(10) Patent No.: US 9,924,064 B2
(45) Date of Patent: Mar. 20, 2018

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/201,076

(22) Filed: Jul. 1, 2016

(65) Prior Publication Data
US 2017/0034365 A1 Feb. 2, 2017

(30) Foreign Application Priority Data
Jul. 29, 2015 (JP) ................................ 2015-149812

(51) Int. Cl.
H04N 1/00 (2006.01)
G06F 3/12 (2006.01)
G06K 15/02 (2006.01)

(52) U.S. Cl.
CPC ... H04N 1/0097 (2013.01); H04N 2201/0094 (2013.01)

(58) Field of Classification Search
None
See application file for complete search history.

(56) References Cited

U.S. PATENT DOCUMENTS

| | | | | |
|---|---|---|---|---|
| 9,350,599 | B1* | 5/2016 | Enright | G06F 21/43 |
| 2005/0183141 | A1* | 8/2005 | Sawada | G03G 21/04 |
| | | | | 726/16 |
| 2006/0271781 | A1* | 11/2006 | Murakawa | G06F 21/31 |
| | | | | 713/168 |
| 2008/0148366 | A1* | 6/2008 | Wahl | G06F 21/36 |
| | | | | 726/4 |
| 2008/0178265 | A1* | 7/2008 | Tsuchiya | G06F 21/34 |
| | | | | 726/3 |
| 2009/0024531 | A1* | 1/2009 | Yamahata | G06F 21/31 |
| | | | | 705/55 |
| 2009/0237715 | A1* | 9/2009 | Kasatani | H04L 63/0815 |
| | | | | 358/1.15 |
| 2010/0253971 | A1* | 10/2010 | Ido | G06F 3/1203 |
| | | | | 358/1.15 |
| 2010/0278381 | A1* | 11/2010 | Tessman | G06F 21/6209 |
| | | | | 382/100 |
| 2011/0090530 | A1* | 4/2011 | Kawakami | G06F 3/1222 |
| | | | | 358/1.15 |

(Continued)

FOREIGN PATENT DOCUMENTS

JP 2010-134797 A 6/2010

*Primary Examiner* — Beniyam Menberu
(74) *Attorney, Agent, or Firm* — Fitzpatrick, Cella, Harper & Scinto

(57) ABSTRACT

An information processing apparatus and a method of controlling the same include/use: a storage unit that stores user information; a timer that clocks a time; a storing unit that stores retention period information indicating a retention period of the user information; and a saving unit that saves data of a job input by a user. The user information stored in the storage unit is deleted in accordance with a current date and time obtained from the timer, the retention period information stored in the storing unit, the user information, and a save status of the data in the saving unit.

9 Claims, 5 Drawing Sheets

(56) References Cited

U.S. PATENT DOCUMENTS

| | | | | |
|---|---|---|---|---|
| 2012/0222028 A1* | 8/2012 | Nakajima | ......... | H04L 29/12254 |
| | | | | 718/1 |
| 2012/0300252 A1* | 11/2012 | Nagata | ............... | H04N 1/00244 |
| | | | | 358/1.15 |
| 2013/0047247 A1* | 2/2013 | Matsuda | ............... | G06F 21/335 |
| | | | | 726/9 |
| 2013/0215461 A1* | 8/2013 | Yasukawa | .......... | H04N 1/00408 |
| | | | | 358/1.15 |
| 2014/0036297 A1* | 2/2014 | Arai | .................. | G06K 15/4095 |
| | | | | 358/1.14 |
| 2014/0240761 A1* | 8/2014 | Nagai | .................. | G06F 3/1222 |
| | | | | 358/1.15 |

\* cited by examiner

| USER ID | LATEST LOGIN DATE/TIME | LATEST USE DATE/TIME | ADMINISTRATOR FLAG |
|---|---|---|---|
| USER A | 2015/3/10 10:00 | 2015/3/9 11:00 | 0 |
| USER B | 2015/3/10 11:00 | 2015/3/18 15:00 | 0 |
| USER C | 2015/3/10 12:00 | 2015/3/10 12:00 | 1 |
| USER D | 2015/3/10 9:00 | 2015/3/9 10:00 | 0 |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Multi-function peripherals (MFPs) are known that have a scanner, a print function, an image saving function, and a communication function to perform copy, print, and scan operations, fax transmission/receiving, and the like. Some of these MFPs further have functions of information processing apparatuses, such as a document file saving function and a user authentication function.

Realization of a user authentication function on an MFP requires management of users of the MFP. Management of the users involves processing of, for example, generating pieces of user information in one-to-one correspondence with the users of the MFP, and deleting user information of a user who no longer uses the MFP. Such deletion of the user information of the user who no longer uses the MFP is performed to avoid a decrease in convenience caused by the unnecessary presence of the user information remaining in the MFP. The decrease in convenience could possibly occur when, for example, a user logs into the MFP by designating his/her icon on a login screen that displays a list of icons corresponding to the pieces of user information. In this case, if many unnecessary pieces of user information remain in the MFP, many icons are displayed, and thus the user may need to go through the trouble of looking for his/her icon.

Furthermore, although it is preferable that user information on an MFP be actually managed by a dedicated administrator, many small-office environments do not have such a dedicated administrator to reduce operational costs. To place priority on convenience rather than security, some of these small-office environments identify a user but do not perform identify confirmation (so-called user authentication) when the user logs into the MFP. Under such environments, each user generates user information by him/herself.

Meanwhile, user information may be deleted by a user him/herself, or may be automatically deleted by an MFP. For example, according to Japanese Patent Laid-Open No. 2010-134797, user information of a user who has not logged in for a certain period is deleted.

A problem with the technique described in Japanese Patent Laid-Open No. 2010-134797 is that a user who has not logged into an MFP for a certain period can no longer log into the MFP, and no longer use the functions of the MFP that are provided on the premise of a login. For example, assume a case in which a user transmits a print job from a PC and stores the print job to the MFP, with an intention to print the print job afterwards. In this case, if the user does not log into the MFP for the certain period, the user can no longer log into the MFP, and the print job saved in the MFP cannot be executed when the user wants to execute the print job.

SUMMARY OF THE INVENTION

An aspect of the present invention is to eliminate the above-mentioned problem with conventional technology.

A feature of the present invention is to provide a technique that enables a user to execute a saved job, even if the user has not logged in for a certain period.

According to a first aspect of the present invention, there is provided an information processing apparatus, comprising: a storage unit configured to store user information; a timer configured to clock a time; a storing unit configured to store retention period information indicating a retention period of the user information; a saving unit configured to save data of a job input by a user; and a control unit configured to perform control to delete the user information stored in the storage unit in accordance with a current date and time obtained from the timer, the retention period information stored in the storing unit, the user information, and a save status of the data saved by the saving unit.

According to a second aspect of the present invention, there is provided an information processing apparatus, comprising: a first storage unit configured to store pieces of identification information of users; a receiving unit configured to receive print data from an external apparatus; a second storage unit configured to store the print data received by the receiving unit in association with a piece of identification information of a user who has issued an instruction for printing the print data; a printing unit configured to, based on an instruction issued by the user while the user is logged into the information processing apparatus, print the print data stored in the second storage unit in association with the piece of identification information of the user; and a deletion unit configured to delete, among the pieces of identification information of the users stored in the first storage unit, a piece of identification information of an ex-login user who has not logged into the information processing apparatus for a certain period, wherein the deletion unit does not delete the piece of identification information of the ex-login user in a case that the piece of identification information of the ex-login user indicates that the ex-login user is a user having a special authority.

According to a third aspect of the present invention, there is provided an information processing apparatus, comprising: a first storage unit configured to store pieces of identification information of users; a receiving unit configured to receive print data from an external apparatus; a second storage unit configured to store the print data received by the receiving unit in association with a piece of identification information of a user who has issued an instruction for printing the print data; a printing unit configured to, based on an instruction issued by the user while the user is logged into the information processing apparatus, print the print data stored in the second storage unit in association with the piece of identification information of the user; and a control unit configured to perform control to disable access to, among the pieces of identification information of the users stored in the first storage unit, a piece of identification information of an ex-login user who has not logged into the information processing apparatus for a certain period, wherein if the piece of identification information of the ex-login user indicates that the ex-login user is a user having a special authority, the control unit disables access to the pieces of identification information excluding the piece of identification information of the ex-login user.

According to a forth aspect of the present invention, there is provided an information processing apparatus, comprising: a first storage unit configured to store pieces of identification information of users; a receiving unit configured to receive print data from an external apparatus; a second storage unit configured to store the print data received by the receiving unit in association with a piece of identification information of a user who has issued an instruction for printing the print data; a printing unit configured to, based on an instruction issued by the user while the user is logged into the information processing apparatus, print the print data stored in the second storage unit in association with the piece of identification information of the user; and a deletion unit configured to delete, among the pieces of identification information of the users stored in the first storage unit, a piece of identification information of an ex-login user who has not logged into the information processing apparatus for a certain period, wherein the deletion unit does not delete the piece of identification information of the ex-login user if print data corresponding to the piece of identification information of the ex-login user is stored at an elapse of the certain period since a latest login by the ex-login user into the information processing apparatus.

According to a fifth aspect of the present invention, there is provided a method of controlling an information processing apparatus, the method comprising: storing pieces of identification information of users; receiving print data from an external apparatus; storing the print data received in the receiving in association with a piece of identification information of a user who has issued an instruction for printing the print data; printing the stored print data in association with the piece of identification information of the user, based on an instruction issued by the user while the user is logged into the information processing apparatus; and deleting a piece of identification information of an ex-login user who has not logged into the information processing apparatus for a certain period, among the stored pieces of identification information of the users, wherein the piece of identification information of the ex-login user is not deleted in the deleting in a case that the piece of identification information of the ex-login user indicates that the ex-login user is a user having a special authority.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Below, a multi-function peripheral having copy, print, scan, fax transmission/receiving, and other functions will be described as an example of an information processing apparatus according to the present invention. However, the present invention is not limited to being applied to such a multi-function peripheral, and is also applicable to an apparatus that executes processing while a user is logged in, such as a printing apparatus and a communication apparatus.

First Embodiment

Figure 1:
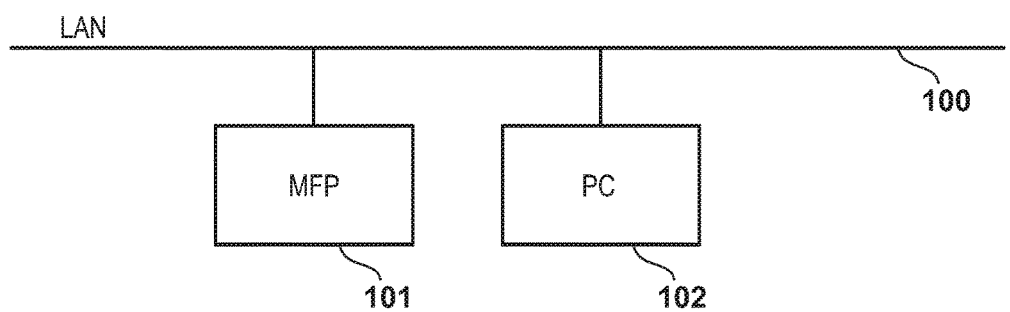
FIG. 1 shows a view illustrating an exemplary configuration of a printing system according to a first embodiment of the present invention.

FIG. 1 shows a view illustrating an exemplary configuration of a printing system according to the first embodiment of the present invention.

In this printing system, an MFP 101 and a PC 102 are connected via a LAN 100. For example, the PC 102 can transmit a print job to the MFP 101, and change the settings of the MFP 101. The MFP 101 is a multi-function peripheral having copy, print, scan, fax transmission/receiving, and other functions. Although only the MFP 101 and the PC 102 are connected to the LAN 100 herein for the sake of simplicity, the present invention is not limited to this configuration.

Figure 2:
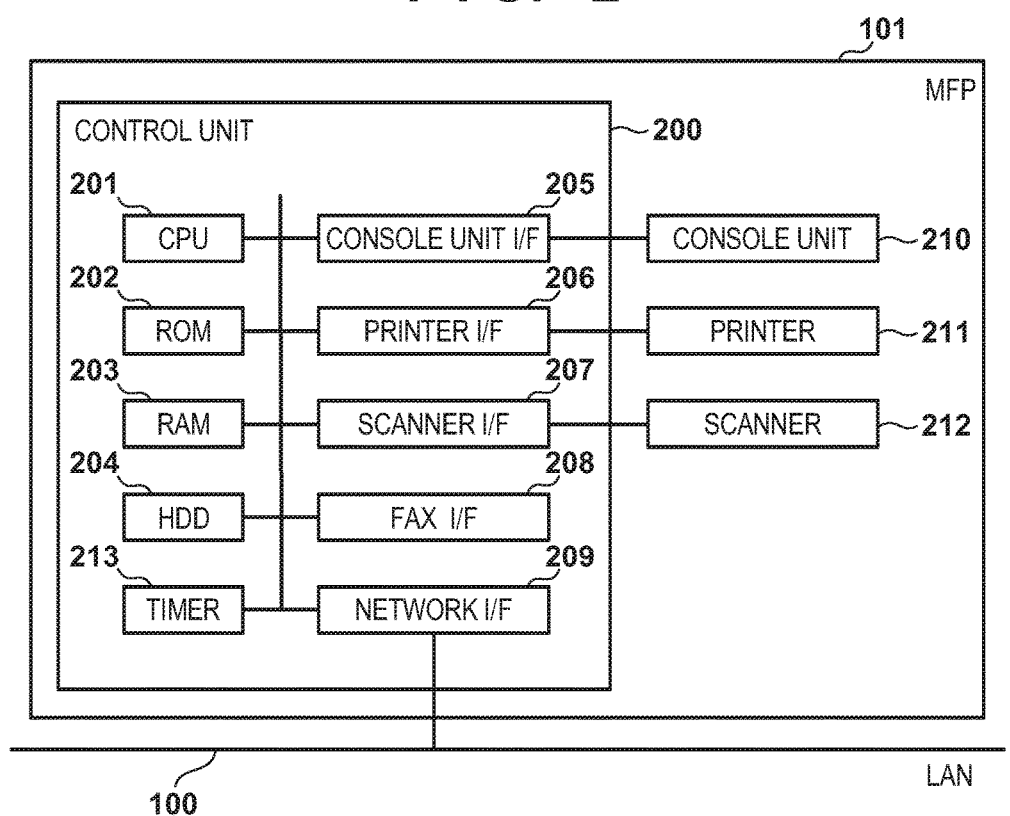
FIG. 2 is a block diagram for describing a hardware configuration of an MFP according to the first embodiment.

FIG. 2 is a block diagram for describing a hardware configuration of the MFP 101 according to the first embodiment.

A control unit 200, which includes a CPU 201, controls the entire operations of the MFP 101. The CPU 201 performs various types of control, such as read control and transmission control, by executing a boot program stored in a ROM 202, reading out an OS and a control program stored in a hard disk drive (HDD) 204, deploying the OS and control program to a RAM 203, and executing the deployed program. The RAM 203 is used as a main memory and a temporary storage area, such as a working area, for the CPU 201. The HDD 204 stores image data and various types of programs.

A console unit I/F 205 establishes connection between a console unit 210 and the control unit 200. The console unit 210 includes various types of keys and a display unit that has a touchscreen function and displays numerous screens in accordance with a user operation. These screens include, for example, a login screen (FIG. 3) and a storing printing screen (FIG. 4).

A printer I/F 206 establishes connection between a printer 211 and the control unit 200. Image data to be printed by the printer 211 is transferred from the control unit 200 to the printer 211 via the printer I/F 206, and the printer 211 prints an image on a recording medium (sheet) based on the image data. A scanner I/F 207 establishes connection between a scanner 212 and the control unit 200. The scanner 212 generates image data by reading an image of an original, and inputs the image data to the control unit 200 via the scanner I/F 207. A fax I/F 208 establishes connection between the control unit 200 and a telephone line (not shown). The fax I/F 208 transmits/receives fax data via the telephone line. A network I/F 209 establishes connection between the MFP 101 and the LAN 100. The network I/F 209 receives a print job from an external apparatus (e.g., the PC 102) connected to the LAN 100, and transmits a response to a print instruction. A timer (real time clock) 213 returns the current date and time in response to a request from the CPU 201, times a period indicated by the CPU 201, and transmits a notification to the CPU 201 using, for example, an interrupt upon the elapse of the period.

Figures 3, 4:
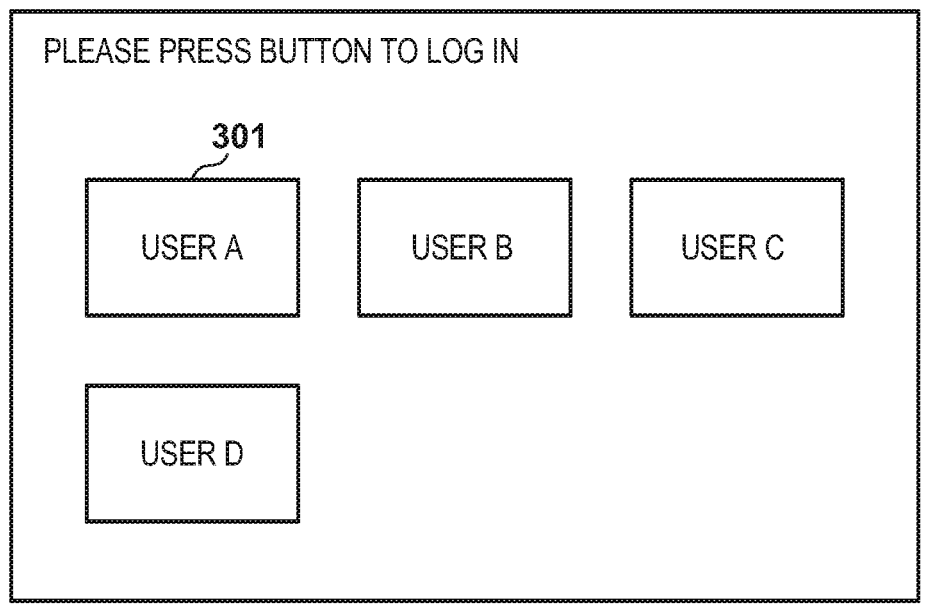
FIG. 3 shows an example of a login screen displayed by the MFP according to the first embodiment.
FIG. 4 shows a view illustrating an example of a storing printing screen displayed by the MFP according to the first embodiment.

FIG. 3 shows a view illustrating an example of a login screen displayed by the MFP 101 according to the first embodiment.

This login screen is displayed on the display unit of the console unit 210. A user can log into the MFP 101 by touching a button corresponding to him/herself on this screen. For example, a user A can log into the MFP 101 by touching a button 301.

FIG. 4 shows a view illustrating an example of a storing printing screen displayed by the MFP 101 according to the first embodiment.

While the user A is logged into the MFP 101, the screen of FIG. 4 is displayed on the display unit of the console unit 210 upon selection of storing printing on a menu screen (not shown). Here, the screen presents a list of documents that have been saved in the HDD 204 as a result of the user A inputting print jobs from the PC 102. The dates and times of the documents denote the dates and times when the documents were saved to the MFP 101, that is to say, the dates and times when the user A transmitted the print jobs from the PC 102. On this screen, the user A selects a desired document by checking a check box 401 corresponding to the desired document. Printing of the selected document is started by pressing a print start button 402. Here, a plurality of documents can be selected, and the number of copies of each document to be printed can be designated by inputting the number of copies.

Figures 5, 6:
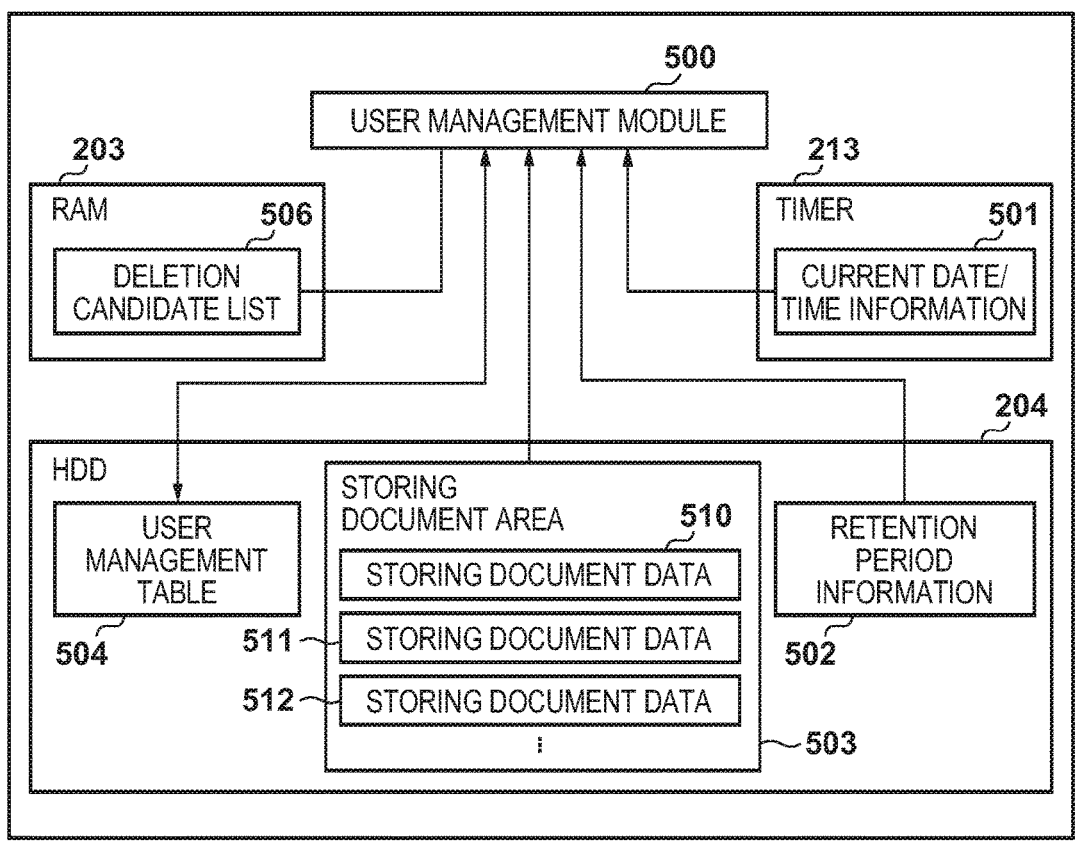
FIG. 5 is a block diagram for describing a software configuration of the MFP according to the first embodiment.
FIG. 6 shows a view illustrating an example of a user management table according to the first embodiment.

FIG. 5 is a block diagram for describing a software configuration of the MFP 101 according to the first embodiment.

A user management module 500 registers, changes, and deletes user information. User information is stored to a later-described user management table 504 (FIG. 6). The timer 213 returns current date/time information 501 in response to a request from the user management module 500. Retention period information 502 includes information of a period for which user information is kept retained in the user management table 504. A storing document area 503 stores pieces of storing document data 510 to 512 that correspond to print jobs transmitted by a user from the PC 102 and that are retained without being immediately executed. The number of pieces of storing document data saved in the storing document area 503 is zero or at least one. Storing document data includes not only document data itself, but also user information of a user who issued a print job including the document data. For example, when the storing printing screen shown in FIG. 4 is displayed while pieces of storing document data are stored, the storing printing screen presents a list of documents that are reserved by a user who is logged into the MFP 101 at that point. The user management table 504 stores user information. A deletion candidate list 506 stores user IDs of candidates representing pieces of user information that should be deleted from the user management table 504 in accordance with later-described processing.

FIG. 6 shows a view illustrating an example of the user management table 504 according to the first embodiment.

Each piece of user information includes a user ID, a latest login date/time, a latest use date/time, and an administrator flag. The user ID is identification information that specifies a corresponding user. The latest login date/time indicates the date and time when the corresponding user logged into the MFP 101 most recently. The latest login date/time is updated each time the corresponding user logs in. The latest use date/time indicates the date and time when the corresponding user used the MFP 101 via the PC 102 most recently. Use of the MFP 101 via the PC 102 includes, for example, transmission of a print job from the PC 102 to the MFP 101. The latest use date/time is also updated each time the corresponding user uses the MFP 101 via the PC 102. The administrator flag indicates whether the corresponding user is an administrator. "1" is stored as the administrator flag if the corresponding user is an administrator, and "0" if the corresponding user is a general user. Herein, the administrator refers to a user who has special authority to, for example, change the settings of the MFP 101. In FIG. 6, a user C is set as the administrator.

Note that each piece of user information in the user management table 504 may include at least some of the user ID, the latest login date/time, the latest use date/time, and the administrator flag, rather than all of them.

Figure 7:
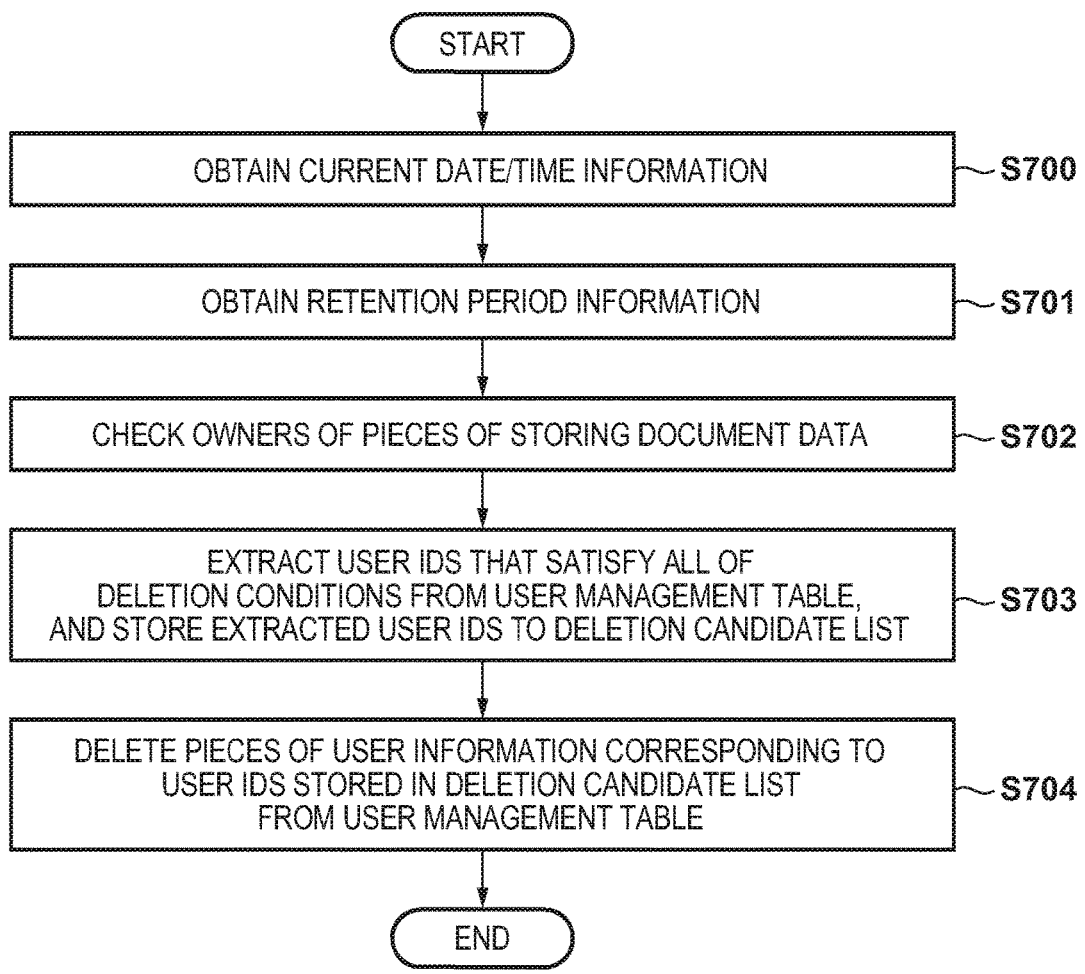
FIG. 7 is a flowchart for describing processing executed by the MFP according to the first embodiment to delete user information from the user management table.

FIG. 7 is a flowchart for describing processing executed by the MFP 101 according to the first embodiment to delete user information from the user management table 504. Note that a program for executing this processing is stored in the HDD 204, deployed to the RAM 203 during the execution, and is executed under control by the CPU 201. This processing is executed periodically (e.g., once every hour).

First, in step S700, the CPU 201 obtains the current date/time information 501 from the timer 213. Next, the processing proceeds to step S701, and the CPU 201 obtains the retention period information 502 stored in the HDD 204. Next, the processing proceeds to step S702, and the CPU 201 checks owners (user IDs) of pieces of storing document data stored in the storing document area 503. Next, the processing proceeds to step S703, and the CPU 201 extracts user IDs that satisfy all of the following deletion conditions from the user management table 504 with reference to the pieces of information obtained in steps S700 to S702 and information stored in the user management table 504. Then, the CPU 201 generates the deletion candidate list 506 including the extracted user IDs, and stores the same to the RAM 203.

A user ID is targeted for deletion if it satisfies all of the following deletion conditions.

A difference between the "current date/time" and the "latest login date/time" corresponding to the user ID exceeds the "retention period."

The "storing document area" stores no "storing document data" corresponding to the user ID, that is to say, the save status of document data of a user corresponding to the user ID indicates that no data is saved.

The "administrator flag" corresponding to the user ID is not "1."

A difference between the "current date/time" and the "latest use date/time" corresponding to the user ID exceeds the "retention period."

Alternatively, for example, instead of satisfying the two conditions regarding the difference between the "current date/time" and the "latest login date/time" and the difference between the "current date/time" and the "latest use date/time", a deletion condition may be that at least one of the differences exceeds the "retention period".

Finally, the processing proceeds to step S704, and the CPU 201 deletes pieces of user information corresponding to all of the user IDs stored in the deletion candidate list 506 from the user management table 504, and ends the present processing. In step S704, instead of deleting pieces of user information corresponding to all of the user IDs stored in the deletion candidate list 506 from the user management table 504, access to these pieces of user information may be disabled.

As described above, in the first embodiment, user information of a user who has not logged in for a certain period is not deleted unconditionally, but is deleted only if it satisfies all the aforementioned deletion conditions. In the first embodiment, the deletion conditions are that a certain period has elapsed since the user logged in most recently; the user has no storing document saved; the user is not an administrator; and a certain period has elapsed since the user used the MFP from the PC, all of which are satisfied.

Therefore, for example, when a certain user has a storing document(s) stored in the MFP, user information of the certain user is not deleted from the user management table even if the certain user has not logged into the MFP for a certain period, or even if the certain user has not used the MFP via the PC for a certain period. This prevents the occurrence of a situation where a print job saved in the MFP cannot be executed when a user wants to execute the print job because the user can no longer log into the MFP.

Second Embodiment

A description is now given of a second embodiment of the present invention. As the configuration of the printing system and the configuration of the MFP 101 according to the above first embodiment are shared in common with the second embodiment, their descriptions will be omitted.

Figure 8:
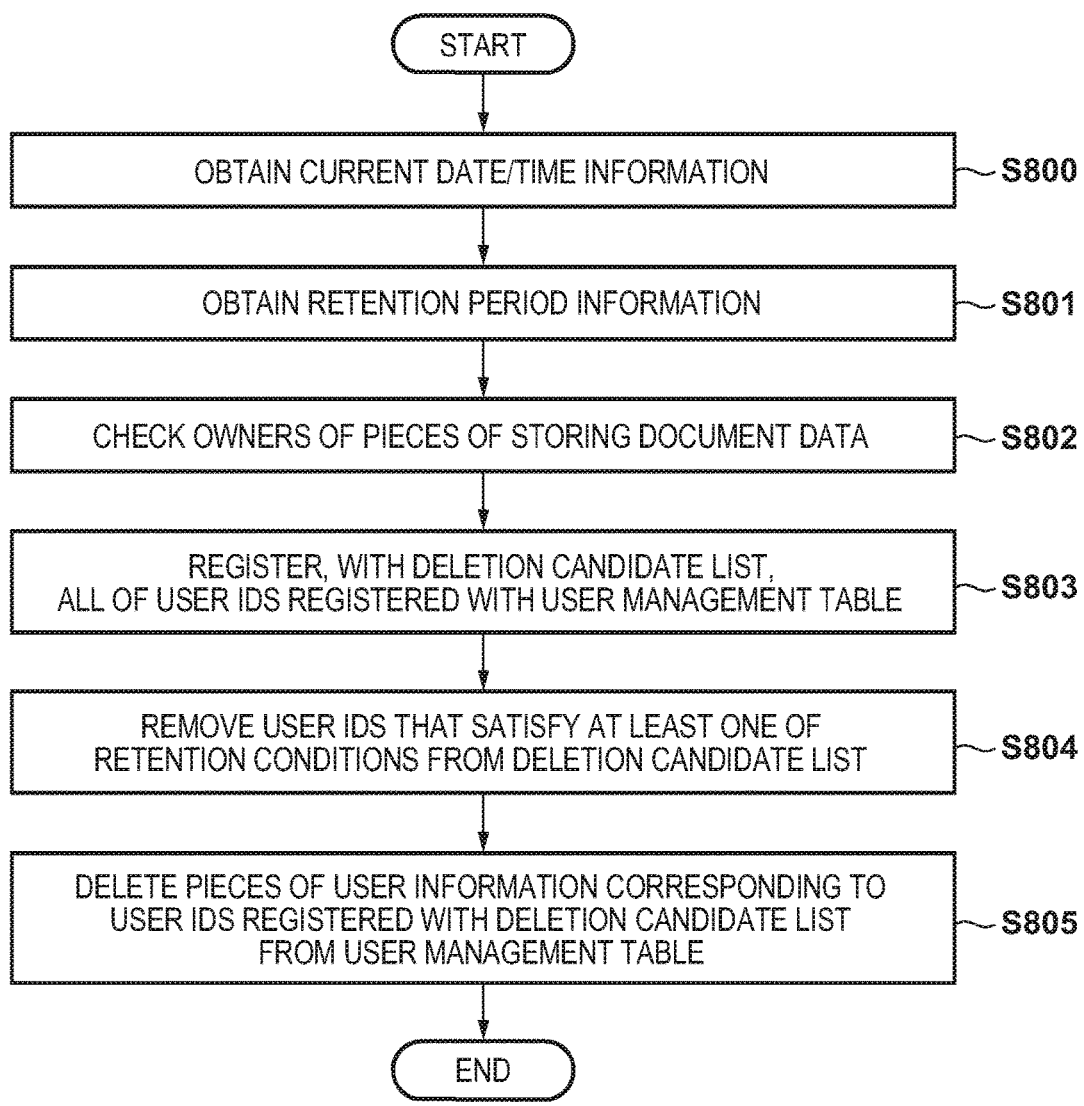
FIG. 8 is a flowchart for describing processing executed by an MFP according to a second embodiment to delete user information from a user management table.

FIG. 8 is a flowchart for describing processing executed by the MFP 101 according to the second embodiment to delete user information from the user management table 504. Note that a program for executing this processing is stored in the HDD 204, deployed to the RAM 203 during the execution, and is executed under control by the CPU 201. This processing is executed periodically (e.g., once every hour).

First, in step S800, the CPU 201 obtains the current date/time information 501 from the timer 213. Next, the processing proceeds to step S801, and the CPU 201 obtains the retention period information 502 stored in the HDD 204. Next, the processing proceeds to step S802, and the CPU 201 checks owners (user IDs) of pieces of storing document data stored in the storing document area 503. Next, the processing proceeds to step S803, and the CPU 201 generates the deletion candidate list 506 including all of user IDs stored in the user management table 504. Next, the processing proceeds to step S804, and the CPU 201 removes user IDs that satisfy at least one of the following retention conditions from the deletion candidate list 506 with reference to the pieces of information obtained in steps S800 to S802 and information stored in the user management table 504. That is to say, the removed user IDs will not be targeted for deletion.

The retention conditions for retaining a user ID are as follows.

A difference between the "current date/time" and the "latest login date/time" corresponding to the user ID does not exceed the "retention period."

The "storing document area" stores at least one piece of "storing document data" corresponding to the user ID, that is to say, the save status of document data of a user corresponding to the user ID indicates that data is saved.

"1" is stored as the "administrator flag" corresponding to the user ID.

A difference between the "current date/time" and the "latest use date/time" corresponding to the user ID does not exceed the "retention period."

Once the deletion candidate list 506 is thus updated in step S804, the processing proceeds to step S805, and the CPU 201 deletes pieces of user information corresponding to the user IDs registered with the deletion candidate list 506 from the user management table 504, and ends the present processing.

As described above, in the second embodiment, user information of a user who has not logged into the MFP for a certain period is not deleted unconditionally; specifically, the user information is not deleted if it satisfies at least one of the aforementioned retention conditions, and is deleted if it satisfies none of the aforementioned retention conditions. The retention conditions include the following conditions: a certain period has not elapsed since the user logged in most recently; the user has a storing document(s); the user is an administrator; and a certain period has not elapsed since the user used the MFP 101 from the PC 102.

Therefore, for example, when a certain user has a storing document(s) stored in the MFP, user information of the certain user is not deleted from the user management table even if the certain user has not logged into the MFP for a certain period, or even if the certain user has not used the MFP from the PC for a certain period. This prevents the occurrence of a situation where a print job saved in the MFP cannot be executed when a user wants to execute the print job because the user can no longer log into the MFP due to the elapse of a certain period without the user using the MFP.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149812, filed Jul. 29, 2015, which is hereby incorporated by reference herein in its entirety.

What is claimed is:

1. A printing apparatus capable of connecting with an external apparatus, the printing apparatus comprising:
   a storage that is capable of storing identification information of one or more users and print data in association with a respective user of the one or more users;
   a network interface that receives the print data from the external apparatus;
   a printing unit;
   a memory that stores instructions; and
   one or more processors which execute the instructions to cause the printing apparatus to function as a control unit configured to control:
   (i) storing of the print data received via the network interface in the storage in association with the identification information of a user, of the one or more users, who operates the external apparatus to print the print data,
   (ii) printing of the print data stored in the storage, based on an instruction by a login user, of the one or more users, while the login user is logged into the printing apparatus, in association with the identification information of the login user, and
   (iii) deleting, among the identification information of the one or more users stored in the storage, identification information of a user where print data corresponding to the identification information of the user is not stored in the storage after an elapse of a certain period of time since a latest login by the user into the printing apparatus,
   wherein the control unit does not delete the identification information of a user, of the one or more users, where print data corresponding to the identification information of the user is stored in the storage after an elapse of the certain period of time since a latest login by the user into the printing apparatus.

2. The printing apparatus according to claim 1, wherein the identification information of a user, of the one or more users, includes at least one of:
   a latest login date/time, indicating a date and time when the user logged into the printing apparatus most recently,
   a latest use date/time indicating a date and time when the user used the printing apparatus via the external apparatus most recently, and
   information indicating whether the user is an administrator.

3. The printing apparatus according to claim 2, wherein the control unit does not delete the identification information of a user, of the one or more users, stored in the storage in a case that a difference between a current date and time obtained from a timer and the latest login date/time included in the identification information of the user does not exceed a retention period.

4. The printing apparatus according to claim 2, wherein the control unit does not delete the identification information of a user, of the one or more users, stored in the storage in a case that a difference between a current date and time obtained from a timer and the latest use date/time included in the identification information of the user does not exceed a retention period.

5. The printing apparatus according to claim 2, wherein the control unit performs the control to delete the identification information of a user, of the one or more users, stored in the storage in a case that the following conditions are satisfied:
   a difference between a current date and time obtained from a timer and the latest login date/time included in the identification information of the user exceeds a retention period;
   the print data input by the user is not stored in the storage; and
   the user is not an administrator.

6. The printing apparatus according to claim 1, wherein the control unit does not delete the identification information of a user, of the one or more users, stored in the storage in a case that the identification information user information indicates that the user is an administrator.

7. The printing apparatus according to claim 1, wherein the control unit performs the control periodically.

8. A method of controlling a printing apparatus capable of connecting with an external apparatus, the method comprising:
   storing identification information of one or more users and print data in association with a respective user of the one or more users in a storage;
   receiving the print data from the external apparatus;
   storing the received print data in the storage in association with the identification information of a user, of the one or more users, who operates the external apparatus to print the print data;
   printing the print data stored in the storage, in association with the identification information of a login user, of the one more users, based on an instruction issued by the login user while the login user is logged into the printing apparatus; and
   deleting, among the identification information of the one or more users stored in the storage, the identification information of a user where print data corresponding to the identification information of the user is not stored in the storage after an elapse of a certain period of time since a latest login by the user into the printing apparatus,
   wherein the identification information of a user, of the one or more users, is not deleted in the deleting in a case that the print data associated with the identification information of the user is stored in the storage after an elapse of the certain period of time since a latest login by the user into the printing apparatus.

9. A non-transitory computer-readable storage medium storing a program for causing a processor to execute a method of controlling a printing apparatus capable of connecting with an external apparatus, the method comprising:
   storing identification information of one or more users and print data in association with a respective user of the one or more users in a storage;
   receiving the print data from the external apparatus;
   storing the received print data in the storage in association with the identification information of a user, of the one or more users, who operates the external apparatus to print the print data;
   printing the print data stored in the storage, in association with the identification information of a login user, of the one or more users, based on an instruction issued by the login user while the login user is logged into the printing apparatus; and
   deleting, among the identification information of the one or more users stored in the storage, the identification information of a user where print data corresponding to the identification information of the user is not stored in the storage after an elapse of a certain period of time since a latest login by the user into the printing apparatus, wherein the identification information of a user, of the one or more users, is not deleted in the deleting in a case that print data associated with the identification information of the user is stored in the storage after an elapse of the certain period of time since a latest login by the user into the printing apparatus.

* * * * *